US010396683B2

(12) United States Patent
Jung et al.

(10) Patent No.: US 10,396,683 B2
(45) Date of Patent: Aug. 27, 2019

(54) MODULAR MULTILEVEL CONVERTER

(71) Applicant: HYOSUNG HEAVY INDUSTRIES CORPORATION, Seoul (KR)

(72) Inventors: Hong-Ju Jung, Seoul (KR); Jong-Yun Choi, Hwaseong-si (KR); June-Sung Kim, Anyang-si (KR); Jung-Soo Park, Uiwang-si (KR); Doo-Young Lee, Anyang-si (KR)

(73) Assignee: HYOSUNG HEAVY INDSTRIES CORPORATION, Seoul (KR)

( * ) Notice: Subject to any disclaimer, the term of this patent is extended or adjusted under 35 U.S.C. 154(b) by 170 days.

(21) Appl. No.: 15/537,740

(22) PCT Filed: Dec. 28, 2015

(86) PCT No.: PCT/KR2015/014354
§ 371 (c)(1),
(2) Date: Jun. 19, 2017

(87) PCT Pub. No.: WO2016/108550
PCT Pub. Date: Jul. 7, 2016

(65) Prior Publication Data
US 2018/0006576 A1    Jan. 4, 2018

(30) Foreign Application Priority Data

Dec. 29, 2014   (KR) .................. 10-2014-0192742

(51) Int. Cl.
*H02M 7/49*        (2007.01)
*H02J 1/00*        (2006.01)
(Continued)

(52) U.S. Cl.
CPC ................ *H02M 7/49* (2013.01); *H02J 1/00* (2013.01); *H02M 7/19* (2013.01);
(Continued)

(58) Field of Classification Search
CPC ........... H02M 7/49; H02M 2001/0016; H02M 2001/008
See application file for complete search history.

(56) References Cited

U.S. PATENT DOCUMENTS

| 2008/0259661 A1* | 10/2008 | Hiller ...................... H02M 7/49 363/71 |
| 2011/0018481 A1* | 1/2011 | Hiller .................... H02M 7/483 318/400.26 |

(Continued)

FOREIGN PATENT DOCUMENTS

| JP | 2013-027260 A | 2/2013 |
| JP | 2013-255422 A | 12/2013 |
| WO | 2014-169388 A1 | 10/2014 |

OTHER PUBLICATIONS

Georgios Konstantinou et al., Active Redundant Submodule Configuration in Modular Multilevel Converters, IEEE Transactions on Power Delivery, Oct. 2013, pp. 2333-2341, vol. 28, No. 4.

*Primary Examiner* — Daniel Kessie
(74) *Attorney, Agent, or Firm* — Novick, Kim & Lee, PLLC; Jae Youn Kim

(57) ABSTRACT

A Modular Multilevel Converter (MMC) includes multiple sub-modules connected in series with each other and a controller for controlling on/off switching of the sub-modules, in which the multiple sub-modules include N sub-modules that participate in the operation of the MMC and M redundant sub-modules for replacing at least one N sub-modules when the at least one N sub-modules fail, and the controller switches on a sub-module if a carrier signal assigned thereto is higher than a preset reference signal, and switches off the sub-module if the carrier signal assigned thereto is lower than the preset reference signal.

5 Claims, 5 Drawing Sheets

(51) Int. Cl.
*H02M 7/19* (2006.01)
*H02M 1/00* (2006.01)
*H02M 7/483* (2007.01)

(52) U.S. Cl.
CPC .............. *H02M 2001/008* (2013.01); *H02M 2001/0016* (2013.01); *H02M 2007/4835* (2013.01)

(56) References Cited

U.S. PATENT DOCUMENTS

| | | | |
|---|---|---|---|
| 2013/0026841 A1* | 1/2013 | Hosini | H02J 3/1842 307/77 |
| 2013/0128636 A1 | 5/2013 | Trainer et al. | |
| 2014/0036557 A1 | 2/2014 | Nondahl et al. | |
| 2015/0200602 A1* | 7/2015 | Narimani | H02M 5/4585 363/37 |
| 2015/0263645 A1* | 9/2015 | Mihalache | H02P 27/14 318/504 |

* cited by examiner

MODULAR MULTILEVEL CONVERTER

TECHNICAL FIELD

The present invention relates, in general, to a Modular Multilevel Converter (MMC) and, more particularly, to an MMC in which M redundant sub-modules are arranged in addition to N sub-modules, which are necessary for the operation of the MMC, and the N+M sub-modules are controlled so as to participate in switching in turn.

BACKGROUND ART

As well known, a general Modular Multilevel Converter (MMC) consists of one or more phase modules 1 as illustrated in FIG. 1, and each of the phase modules 1 has N sub-modules 10 connected in series with each other, each of the N sub-modules having two output terminals X1 and X2. Also, load connection terminals L1, L2 and L3 may be connected to 3-phase loads, for example, a 3-phase AC power system. The phase module 1 is divided into an upper part phase module 1a and a lower part phase module 1b based on the load connection terminals L1, L2 and L3.

Generally, an MMC uses a Pulse Width Modulation (PWM) method to switch sub-modules. Among various PWM methods, a Phase-shifted Carrier (PSC)-PWM method is advantageous in that multilevel output may be produced and in that fewer harmonic waves are output even at a low switching frequency.

FIG. 2 is a view illustrating the carriers of PSC-PWM applied to a conventional MMC.

Referring to FIG. 2, in the conventional MMC, when a desired reference signal 21 has a value that ranges from −1 to 1, the carrier signals 22, assigned to the N sub-modules 10, are configured to oscillate within a range between −1 and 1. Here, the reference signal 21 is compared with the carrier signals 22 assigned to the N sub-modules 10, and the sub-module 10, the triangular wave 22 of the carrier signal of which is higher than the reference signal 21, is switched on, but the sub-module 10, the triangular wave 22 of the carrier signal of which is lower than the reference signal, is switched off. The on/off switching of the sub-modules is controlled by a controller (not illustrated).

In the conventional method, N carriers must be retained. In other words, if any one of the N sub-modules fails, the N carriers are not retained, thus adversely affecting the operation of the MMC.

In order to solve the above problem, in the conventional art a method was proposed in which M redundant sub-modules are additionally arranged in addition to the N sub-modules that participate in the operation, and the operation is performed using the N+M sub-modules. However, in this case, the carriers must continuously change N sub-modules, among the M+N sub-modules. For example, if the carriers of the first to N-th sub-modules are maintained in the current cycle, the carriers must be changed in the next cycle such that the carriers of the second to (N+1)-th sub-modules are maintained. Here, when the carriers are changed, because the switching states are also changed, which incurs unnecessary switching, the switching frequency is increased. Also, it is difficult to implement a controller capable of rotating the carriers.

DISCLOSURE

Technical Problem

Accordingly, the present invention has been made keeping in mind the above problems, and an object of the present invention is to provide a modular multilevel converter (MMC) in which N sub-modules, which are necessary for the operation of the MMC, and M redundant sub-modules are arranged, and the N+M sub-modules are controlled to participate in switching in rotation.

Also, another object of the present invention is to provide a modular multilevel converter in which N+M phase-shifted carriers are assigned to N+M sub-modules and in which the N+M carrier signals are configured such that the range from the top to a rest position thereof is not balanced with the range from the bottom to the rest position thereof.

Technical Solution

A Modular Multilevel Converter (MMC) according to an embodiment of the present invention includes multiple sub-modules connected in series with each other; and a controller for controlling on/off switching of the sub-modules, wherein the multiple sub-modules include N sub-modules, which participate in operation of the MMC, and M redundant sub-modules, which participate in the operation in place of a failing sub-module when at least one of the N sub-modules fails, and the controller switches on a sub-module if a carrier signal assigned thereto is higher than a preset reference signal, and switches off a sub-module if a carrier signal assigned thereto is lower than the preset reference signal, among the N+M sub-modules to which the carrier signals are assigned.

In the present invention, each of the carrier signals of the N+M sub-modules is configured such that a range from a top to a rest position thereof is not balanced with a range from a bottom to the rest position thereof.

In the present invention, when the reference signal oscillates within a top-to-bottom range from −A to +A, each of the carrier signals oscillates within a top-to-bottom range from −A to +(A×(N+M)/N).

In the present invention, each of the N+M sub-modules is switched on and is then switched off after the carrier signal corresponding thereto is phase-shifted by M carrier signals.

In the present invention, N+M carrier signals are assigned to the N+M sub-modules, respectively, and N sub-modules, selected from among the N+M sub-modules, rotationally participate in the operation of the MMC.

In the present invention, all of the N+M sub-modules perform on/off switching.

Advantageous Effects

According to the present invention, because the carriers of N+M sub-modules of an MMC are set such that the range from the rest position to the top of the carriers is not balanced with the range from the rest position to the bottom thereof, all of the N+M sub-modules, including redundant sub-modules, participate in switching, whereby unnecessary switching, which occurs when shifting the carriers in a conventional method, may be eliminated.

Also, according to the present invention, because it is not necessary for a controller of N+M sub-modules to continually shift carriers, the controller may be simply implemented.

Accordingly, the present invention enables an MMC system to effectively operate and to be simply implemented by omitting unnecessary operation.

BEST MODE

Figure 1:
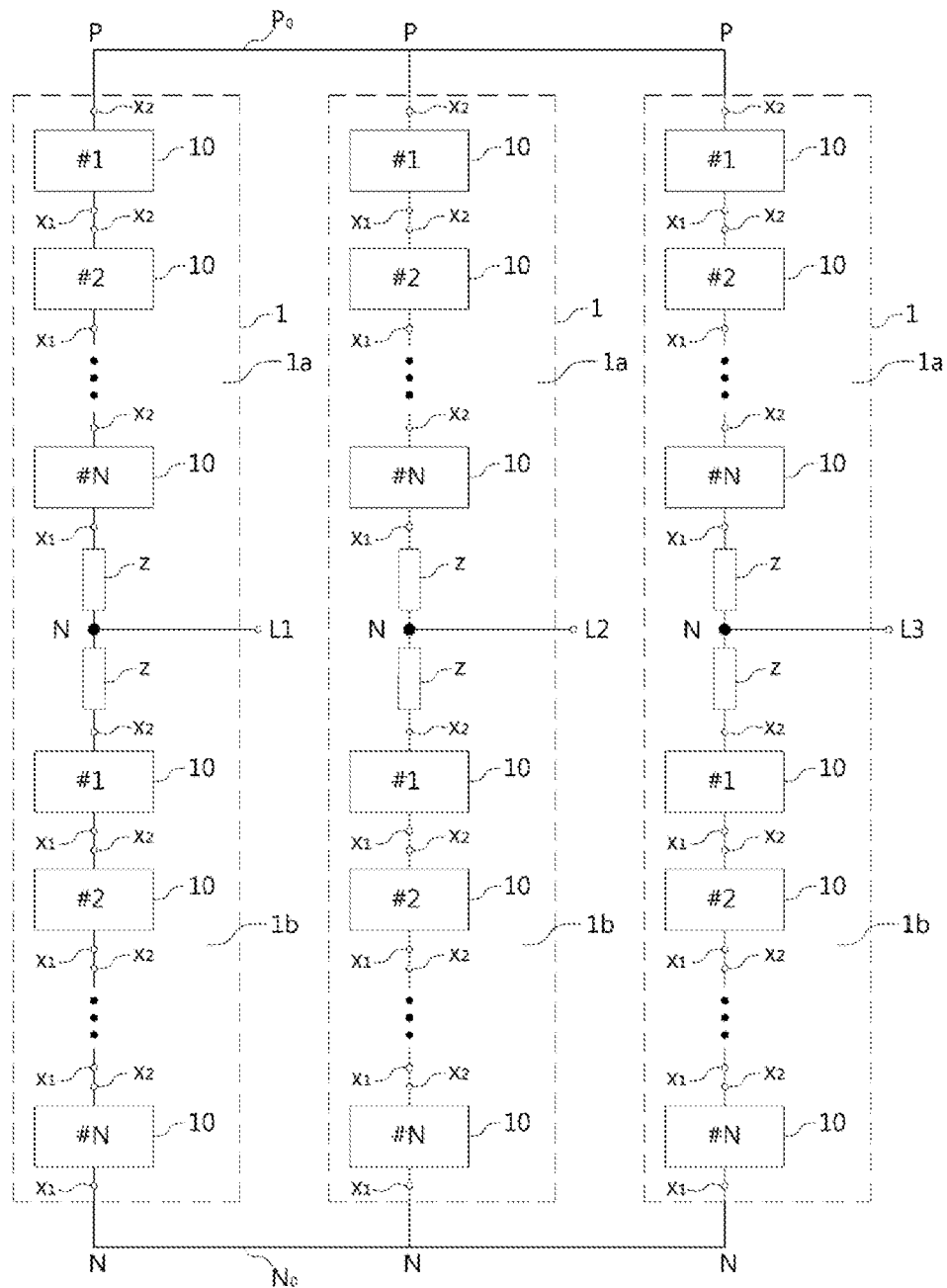
FIG. 1 is a circuit diagram of a conventional MMC.

Hereinafter, some embodiments of the present invention will be described in detail with reference to exemplary drawings. Reference should now be made to the drawings, in which the same reference numerals are used throughout the different drawings to designate the same or similar components. In the following description, it is to be noted that, when the functions of conventional elements and the detailed description of elements related with the present invention may make the gist of the present invention unclear, a detailed description of those elements will be omitted.

It will be understood that, although the terms "first," "second," "A," "B," "(a)," "(b)," etc. may be used herein to describe various elements, these terms are only used to distinguish one element from another element, and the essentials or the order of these elements should not be limited by these terms. When a first element is described as being "connected," "combined," or "coupled" to a second element, it should be understood that the first element may be directly connected or coupled to the second element but that another element may alternatively be "connected," "combined" or "coupled" therebetween.

Figure 3:
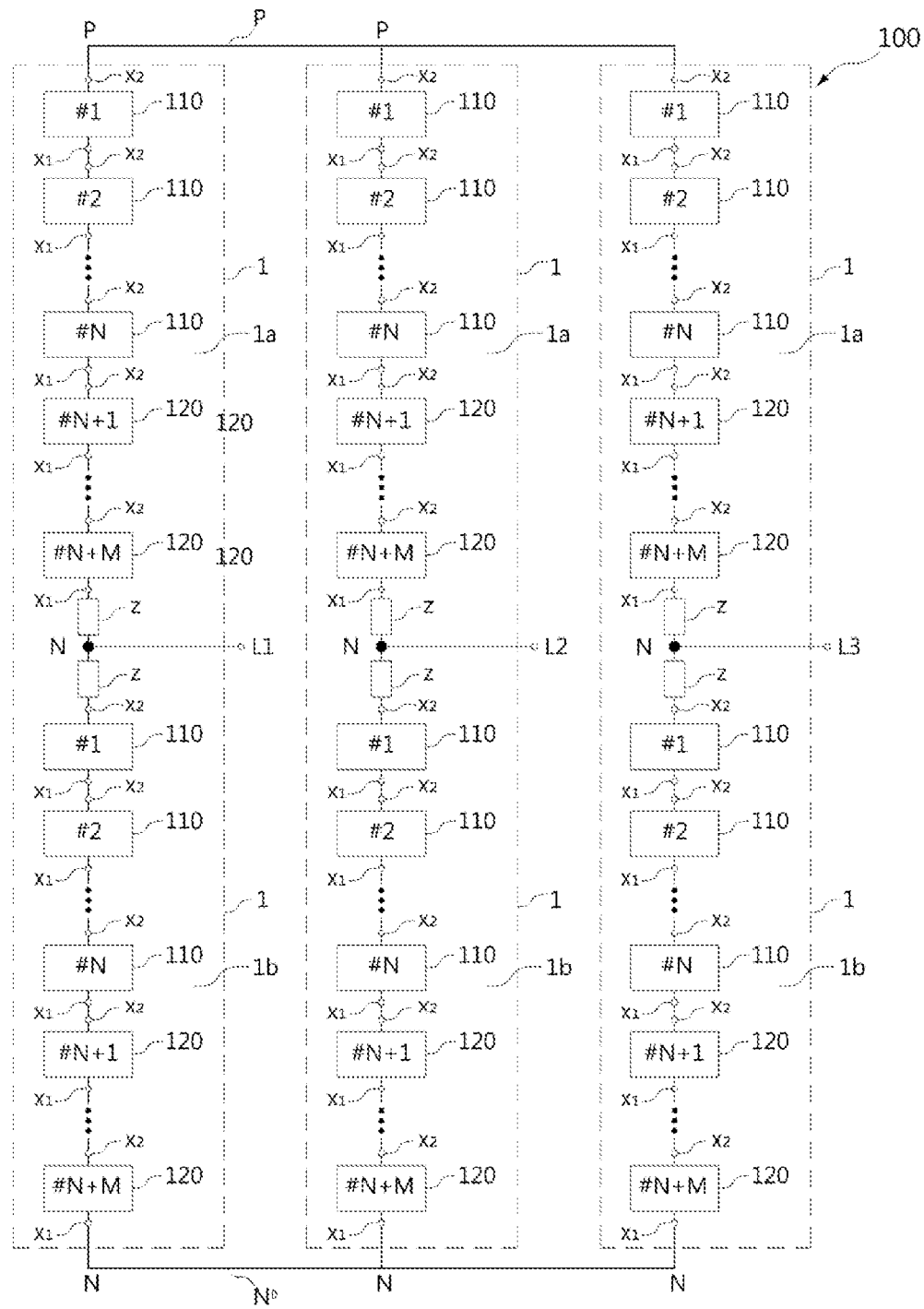
FIG. 3 is an exemplary view of an MMC according to an embodiment of the present invention.

FIG. 3 is an exemplary diagram of an MMC according to an embodiment of the present invention.

Referring to FIG. 3, an MMC 100 according to the present invention basically generates N+1 or 2N+1 level voltage using N sub-modules 110 included in each of an upper part phase module 101a and a lower part phase module 101b, N being a natural number. Here, in order to stably operate the MMC in the event of failure of the N sub-modules 110, M redundant sub-modules 120 are added, and operation is performed using the M+N sub-modules, M being a natural number. Here, because M redundant sub-modules 120 are added in each of the phase modules 101a and 101b, a total of N+M sub-modules 110 and 120 are connected in series in each of the phase modules 101a and 101b. Here, in order to operate the MMC using the N+M sub-modules, N sub-modules must operate normally while the remaining M sub-modules are maintained in a standby state.

In the present invention, if any one of the N operating sub-modules 110 fails, one of the M redundant sub-modules 120 immediately replace the failing one. In other words, in order to normally operate the MMC even when failure occurs in the N sub-modules 110, one of the redundant sub-modules 120 must immediately operate in place of the failing one. Therefore, the DC voltage balance must be maintained between the N+M sub-modules. To this end, all of the N+M sub-modules 110 and 120, including the redundant sub-modules 120, participate in on/off switching by having carriers assigned thereto, whereby overall balance is maintained. In other words, the number of sub-modules that are operating at any instant in order to generate N+1 level voltage is N, but the N+M sub-modules rotationally participate in switching. Here, the on/off switching of the N+M sub-modules is controlled by a controller (not illustrated).

Figure 4:
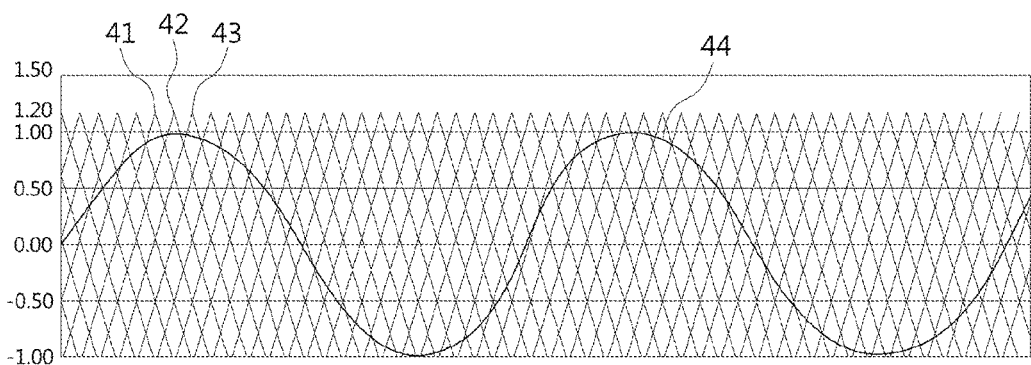
FIG. 4 is a waveform diagram illustrating the carriers of PSC-PWM implemented in an MMC according to an embodiment of the present invention.

FIG. 4 is a waveform diagram of PSC-PWM implemented in an MMC according to an embodiment of the present invention.

Referring to FIG. 4, in an MMC according to an embodiment of the present invention, on/off switching of N+M sub-modules is implemented by applying a Phase-Shifted Carrier (PSC)-PWM method. To this end, switching of the sub-modules is implemented by comparing a carrier signal with a reference signal. Here, the reference signal is represented as a sine wave, and a carrier signal is represented as a triangular wave, but the present invention is not limited thereto. The carrier signals are present in a number of N+M that depends on the number of sub-modules, that is, N+M sub-modules. As illustrated in the drawing, each of the carrier signals is represented as being phase-shifted, but the carrier signals have the same frequency and the same amplitude. These carrier signals are compared with the reference signal, and on/off switching of the sub-modules is controlled based on the result of the comparison.

In an embodiment of the present invention, it is desirable for the range within which the N+M carrier signals oscillate to be wider than the range within which the reference signal oscillates. In other words, if the reference signal is a sine wave that oscillates between −A and +A, the carrier signals oscillate between −A and +(A+α). Specifically, N+M phase-shifted carrier signals, assigned to N sub-modules, participating in the operation of the MMC, and M redundant sub-modules, oscillate between −A and +(A(N+M)/N). Accordingly, each of the carrier signals oscillates such that the range from the rest position to the top thereof is not balanced with the range from the rest position to the bottom thereof. In the example of FIG. 4, assuming that the number of the sub-modules that are operating is 10 (N=10), that the number of redundant sub-modules is 2 (M=2), and that the reference signal has a value that ranges from −1 to 1, the N+M carrier signals oscillate within the range from −1 to +1.2 (=1×(10+2)/10).

Figure 2:
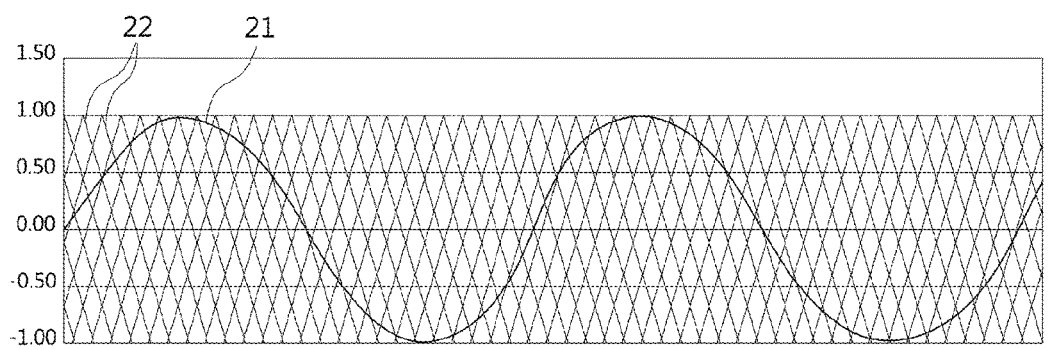
FIG. 2 is a waveform diagram illustrating the carriers of PSC-PWM in a conventional MMC.

Here, the sub-module, the carrier signal of which is higher than the reference signal, is switched on, and the submodule, the carrier signal of which is lower than the reference signal, is switched off. Therefore, as shown in FIG. 4, as the carrier signals are set such that the range from the top to the rest position thereof is not balanced with the range from the bottom to the rest position thereof, all of the N+M sub-modules may participate in switching rotationally. In the conventional art, illustrated in FIG. 2, because the top-to-bottom variance of the reference signal is the same as that of the carrier signals, there may no sub-module having a carrier signal higher than the reference signal, in which case the sub-modules are switched off. That is, not all the N+M sub-modules may participate in on/off switching in turn, unlike the present invention.

Also, in the example illustrated in FIG. 4, when the reference signal has a value that ranges from −1 to 1, the carrier signal oscillates within the range from −1 to 1.2, thereby exhibiting an unbalanced waveform. Accordingly, after the first sub-module is switched on as the first carrier signal 41, corresponding thereto, becomes higher than the reference signal, when the second carrier signal 42 becomes higher than the reference signal 42 at time T1, the first sub-module is not switched off. Instead, the first sub-module is switched off when the third carrier signal 43 becomes higher than the reference signal at time T2. This enables the first carrier signal 41 to have the effect of being phase-shifted by two carrier signals. Therefore, the first sub-module, corresponding to the first carrier signal 41, is switched on, and is then switched off after two carrier signals are phase-shifted. This phase-shift effect is determined depending on the number of redundant sub-modules, namely M. In other words, the carrier signal has the effect of being phase-shifted by M signals. For example, if M is 2, as in the example of FIG. 4, an effect of phase shifting by two carrier signals may be realized.

Figure 5:
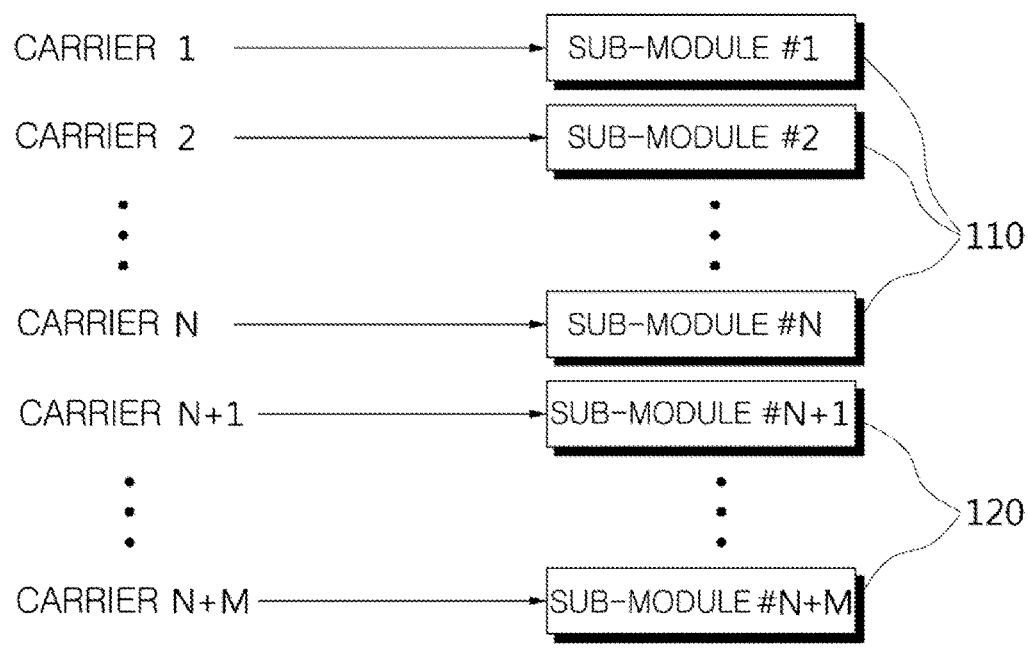
FIG. 5 is a view illustrating that carriers are assigned to N+M sub-modules in an MMC according to an embodiment of the present invention.

As described above, the present invention enables all of the N+M sub-modules to participate in switching, and on/off switching of each of the sub-modules has a phase-shifting effect, unlike the conventional method. FIG. 5 is a view illustrating the process of switching N+M sub-modules in an MMC according to an embodiment of the present invention.

Referring to FIG. 5, in an MMC according to an embodiment of the present invention, N+M carrier signals are represented by assigning carriers to N+M sub-modules. This is intended to make all of the N+M sub-modules participate in on/off switching.

As shown in the drawing, carrier signal 1 is assigned to sub-module #1, carrier signal 2 is assigned to sub-module #2, and carrier signal N is assigned to sub-module #N. Also, carrier signal (N+1) is assigned to submodule #(N+1), and carrier signal (N+M) is assigned to submodule #(N+M). This differs from the conventional art, in which the carrier signals are assigned only to N sub-modules that are participating in the operation of the MMC.

Here, the number of sub-modules that are participating in the operation of the MMC is N. For example, only the N sub-modules, from sub-module #1 to sub-module #N, participate in the operation. In the case of the remaining sub-modules from sub-module #N+1 to sub-module #N+M, carrier signals are assigned thereto and on/off switching thereof is performed, but the remaining sub-modules do not participate in the operation. However, if at least one of the N sub-modules from sub-module #1 to sub-module #N fails, one of the remaining sub-modules immediately participates in the operation in place of the failing sub-module. To this end, on/off switching of the remaining sub-modules is continuously performed even in a standby state.

In the conventional art, after N carrier signals are assigned to N sub-modules, the N carrier signals must be sequentially shifted to the remaining M sub-modules, but the present invention does not need to shift the carrier signals.

As described above, in the present invention, each of the upper part phase module and the lower part phase module of an MMC includes N sub-modules required for the operation of the MMC, and M redundant sub-modules are additionally arranged in each of the phase modules, whereby operation is performed using the N+M sub-modules. Here, the number of normally operating sub-modules must be N, and the remaining M sub-modules must be maintained in a standby state. In order to operate the MMC system normally when any one of the N operating sub-modules fails, one of the redundant sub-modules must immediately replace the failing sub-module. To this end, all of the N+M sub-modules, including the redundant sub-modules, must participate in switching. That is, the number of sub-modules that instantaneously generate multilevel voltage of N+1 levels is N, but the N+M sub-modules rotationally participate in on/off switching.

As described above, although all components constituting an embodiment of the present invention have been described as being combined into one element or being operated as a single unit, the present invention is not limited thereto. That is, all components may be selectively combined into one or more components and operated. Also, the terms such as "include," "comprise," or "have" specify the presence of the stated element but do not preclude the addition of one or more other elements unless otherwise specified. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as having ideal or excessively formal meanings unless they are definitely defined in the present specification.

The above description is merely an illustration of the technical spirit of the present invention, and those having ordinary knowledge in the technical field to which the present invention pertains can make modifications and variations within the range that does not depart from the essential characteristics of the present invention. Accordingly, the disclosed embodiments of the present invention are not intended to limit the technical spirit of the present invention but to illustrate the technical spirit of the present invention, and the scope of the technical spirit of the present invention is not limited to these embodiments. The range of protection of the present invention should be interpreted based on the following claims, and all technical spirit within the range equivalent to the claims should be construed as falling within the range of the rights of the present invention.

The invention claimed is:

1. A Modular Multilevel Converter (MMC) comprising:
multiple sub-modules connected in series with each other; and
a controller for controlling on/off switching of the multiple sub-modules,
wherein the multiple sub-modules include N sub-modules, which participate in operation of the MMC, and M redundant submodules, which participate in the operation of the MMC in place of at least one N sub-modules when the at least one N sub-modules fail,
wherein the controller switches on a sub-module, among the N+M sub-modules to which carrier signals are assigned, if a carrier signal assigned thereto is equal to or higher than a preset reference signal, and switches off the sub-module if the carrier signal assigned thereto is lower than the preset reference signal, and
wherein a range from a top to a rest position of each of the carrier signals of the N+M sub-modules is not balanced with a range from a bottom to the rest position thereof.

2. The MMC of claim 1, wherein when the preset reference signal oscillates within a top-to-bottom range from −A to +A, each of the carrier signals oscillates within a top-to-bottom range from −A to +(A×(N+M)/N).

3. The MMC of claim 2, wherein each of the N+M submodules is switched on and is then switched off after the carrier signal corresponding thereto is phase-shifted by M carrier signals.

4. The MMC of claim 1, wherein N+M carrier signals are assigned to the N+M sub-modules, respectively, and N submodules, selected from the N+M sub-modules, rotationally participate in the operation of the MMC.

5. The MMC of claim 4, wherein all of the N+M sub-modules perform on/off switching.

* * * * *